United States Patent
Wilkes et al.

(10) Patent No.: US 11,520,632 B1
(45) Date of Patent: *Dec. 6, 2022

(54) SPECIFYING BEHAVIOR AMONG A GROUP OF COMPUTING TASKS

(71) Applicant: Google LLC, Mountain View, CA (US)

(72) Inventors: John Wilkes, Palo Alto, CA (US); David Oppenheimer, San Francisco, CA (US); Walfredo Cirne, Palo Alto, CA (US); Cosmos Nicolaou, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/825,578

(22) Filed: Mar. 20, 2020

Related U.S. Application Data

(63) Continuation of application No. 16/238,200, filed on Jan. 2, 2019, now Pat. No. 10,606,644, which is a continuation of application No. 15/670,777, filed on Aug. 7, 2017, now Pat. No. 10,176,016, which is a
(Continued)

(51) Int. Cl.
*G06F 9/50* (2006.01)
*H04L 67/61* (2022.01)
*H04L 65/80* (2022.01)

(52) U.S. Cl.
CPC .......... *G06F 9/5005* (2013.01); *G06F 9/5038* (2013.01); *G06F 9/5044* (2013.01); *G06F 9/5055* (2013.01); *H04L 67/61* (2022.05); *G06F 2209/506* (2013.01); *H04L 65/80* (2013.01)

(58) Field of Classification Search
None
See application file for complete search history.

(56) References Cited

U.S. PATENT DOCUMENTS

| 8,392,575 B1 | 3/2013 | Marr |
| 8,627,322 B2 | 1/2014 | Chaudhry et al. |
| 9,002,795 B2 | 4/2015 | Messinger et al. |

(Continued)

OTHER PUBLICATIONS

Keeton, et al., "Designing for disasters", Conference on File and Storage Technologies (FAST'04) San Francisco, CA, Mar.-Apr. 2004, 14 pages.

(Continued)

*Primary Examiner* — Qing Yuan Wu
(74) *Attorney, Agent, or Firm* — Lerner, David, Littenberg, Krumholz & Mentlik, LLP

(57) ABSTRACT

A method of specifying behavior among a group of computing tasks included in a request to be performed in a domain of computing resources is disclosed. Method steps include receiving, at a scheduler operably coupled to the domain, a p/f request, the received p/f request including a first group and a first relationship, the first group comprising at least a first p/f group element and a second p/f group element, the first relationship defining a desired behavior of the first and second p/f group elements with respect to each other during performance of the p/f request; determining whether the domain includes available computing resources capable of satisfying the first relationship; and in response to a determination that the domain includes available computing resources capable of satisfying the first relationship, allocating, with the scheduler, at least one available computing resource to fulfill the p/f request.

14 Claims, 3 Drawing Sheets

Related U.S. Application Data continuation of application No. 14/252,415, filed on Apr. 14, 2014, now Pat. No. 9,727,379.

(56) References Cited

U.S. PATENT DOCUMENTS

| | | | |
|---|---|---|---|
| 9,250,974 | B1 | 2/2016 | Estes et al. |
| 2007/0061180 | A1* | 3/2007 | Offenberg ........ G06Q 10/06312 705/7.22 |
| 2012/0102199 | A1 | 4/2012 | Hopmann et al. |
| 2012/0102369 | A1 | 4/2012 | Hiltunen et al. |
| 2012/0284390 | A1 | 11/2012 | Chokkalingam et al. |
| 2013/0198723 | A1 | 8/2013 | Gupta et al. |

OTHER PUBLICATIONS

Wilkes, "Traveling to Rome: QoS specifications for automated storage system management", Proceedings of the International Workshop on Quality of Service (IWQos), Jun. 6-8, 2001, Karlsruhe, Germany, Lecture Notes in Computer Science 2001, pp. 75-91.

Wilkes, "Traveling to Rome: a retrospective on the journey", Operating Systems Review (OSR), vol. 43, Issue 1, Jan. 2009, pp. 10-15.

Golding et al., "Attribute-managed storage", Oct. 1995, Workshop on Modeling and Specification of I/O.

Golding et al., "Using attribute-managed storage to achieve QoS", Jun. 1997, Proc. 5th Intl. Workshop on Quality of Service, pp. 199-202.

Wei, et al., "Research and Design of an Attribute-managed Storage-cluster Based on TCP/IP Network", Jul. 2007, IEEE, pp. 332-336.

David Oppenheimer, Jeannie Albrecht, David Pai I Erson, and Amin Vahdat, "Design and Implementation Tradeoffs For Wide-Area Resource Discovery", HPDC '05, Jul. 26, 2005, 26 pages.

Paul Z. Kolano, "High Performance Reliable File Transfers Using Automatic Many-to-Many Parallelization" Aug. 28, 2012, 10 pages.

Francine Berman and Richard Wolski, "Scheduling From the Perspective of the Application", 1996, 12 pages.

Walfredo Cirne and Eitan Frachtenberg, "Web-scale Job Scheduling", 2012, 16 pages.

Olivier Beaumont, Lionel Eyraud-Dubois, Pierre Pesneau, and Paul Renaud-Goud, "Reliable Service Allocation In Clouds With Memory and Capacity Constraints", Aug. 3, 2013, 11 pages.

Kavitha Ranganathan, Adriana Iamnitchi, and Ian Foster, "Improving Data Availability through Dynamic Model-Driven Replication in Large Peer-to-Peer Communities", 2002, 6 pages.

Latency (engineering), retrieved from Wikipedia on Jul. 2, 2018, pp. 1-6.

* cited by examiner

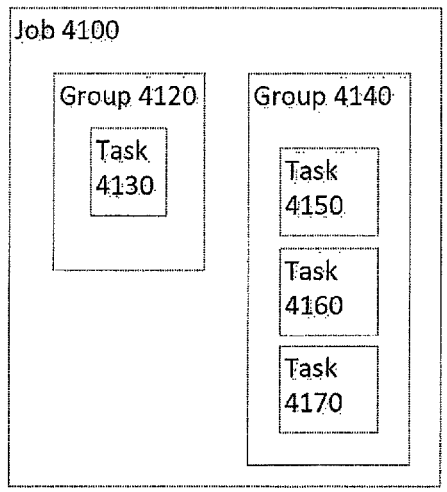
Fig. 1
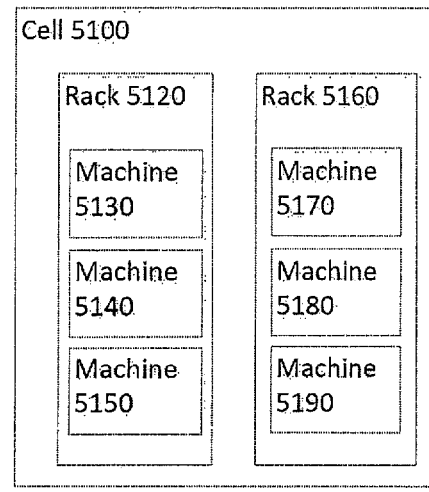
Fig. 2
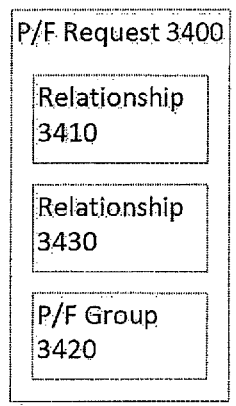
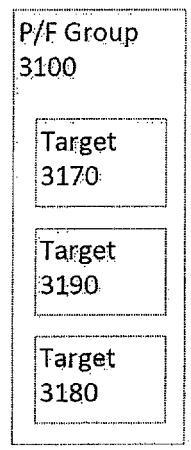
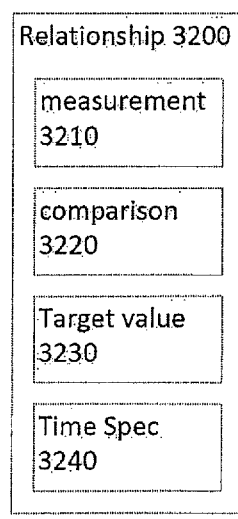
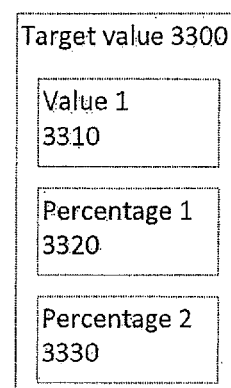
Fig. 3d     Fig. 3a     Fig. 3b     Fig. 3c

SPECIFYING BEHAVIOR AMONG A GROUP OF COMPUTING TASKS

CROSS-REFERENCE TO RELATED APPLICATION

The present application is a continuation of U.S. patent application Ser. No. 16/238,200, filed on Jan. 2, 2019, which is a continuation of U.S. patent application Ser. No. 15/670,777, filed on Aug. 7, 2017, which is a continuation of U.S. patent application Ser. No. 14/252,415, filed on Apr. 14, 2014, now U.S. Pat. No. 9,727,379, the disclosures of which are incorporated herein by reference.

BACKGROUND

Today increasingly, a complex large-scale computing environment is composed of multiple systems. These systems are independently developed and interact with each other, as well as interact with the user(s). Each of these systems in the environment manages a great number of resources. Some resources, however, may be limited in their availability either due to the constraints of tasks or processes utilizing them or due to problems with reliability of hardware or software portions thereof.

A challenge in such environments is effective scheduling, management and allocation of resources in the face of usage and/or reliability concerns as well as system maintenance and upgrade or update activities.

SUMMARY

In some embodiments of solutions discussed herein, a complex large-scale computing environment is composed of multiple systems. Such an environment may therefore be thought of, in some cases, as a system-of-systems. Such an environment may have one or more resource schedulers that manage system resources and allow various tasks to utilize or access those resources.

Existing systems allow constraints to be specified that are of the form "task X needs resource Y", or "task X needs resources with property Z". That makes it easy to steer requests to resources, but it doesn't make it easy for requests to specify desired or expected minimum performance and reliability levels.

Embodiments of solutions and techniques discussed herein may pertain to a method of specifying behavior among a group of computing tasks included in a request to be performed in a domain of computing resources, the method comprising: receiving, at a scheduler operably coupled to the domain, a p/f request, the received p/f request including a first group and a first relationship, the first group comprising at least a first p/f group element and a second p/f group element, the first relationship defining a desired behavior of the first and second p/f group elements with respect to each other during performance of the p/f request; determining whether the domain includes available computing resources capable of satisfying the first relationship; and in response to a determination that the domain includes available computing resources capable of satisfying the first relationship, allocating, with the scheduler, at least one available computing resource to fulfill the p/f request.

In some embodiments, the first p/f group element is a first computing task and the second p/f group element is a second computing task. In some embodiments, the first p/f group element is a second p/f group, the second p/f group comprising at least one p/f group element.

In some embodiments, the first relationship includes information about a measurement representing the desired behavior to be defined, a target value representing a quantitative target associated with the measurement, and a comparison that determines how the measurement relates to the target value.

In some embodiments, the first relationship further includes a time specification that specifies an effective duration of the first relationship.

In some embodiments, the target value comprises information about a mean value and information about a value range such that the first relationship defines an acceptable measurement value range that can satisfy the target value.

In some embodiments, the target value includes information about an expected compliance level such that the first relationship defines a desired fraction of measurements that satisfy the target value, the desired fraction being less than all measurements.

In some embodiments, the value range is specified by a percentage. In some embodiments, the measurement is a measure of round-trip latency for data exchange between group elements. In some embodiments, the measurement is a measure of time to failure of any group element.

In some embodiments, the first relationship is a hard constraint and the determining step includes determining whether the domain includes available computing resources to satisfy the first relationship for a predetermined time period such that in response to a determination that the domain does not include available computing resources to satisfy the first relationship for the predetermined time period, the scheduler does not allocate any resources to fulfill the p/f request.

In some embodiments, the first relationship is a soft constraint and the determining step includes determining whether the domain includes any computing resources capable of completely satisfying the first relationship such that in response to a determination that the domain includes any computing resources capable of satisfying the first relationship, the scheduler allocates available resources to fulfill the p/f request and at least partially satisfy the first relationship.

In some embodiments, the p/f request includes a second relationship, the second relationship defining a desired behavior of the first and second group elements with respect to each other during performance of the p/f request.

In some embodiments, the method further comprises receiving a second p/f request, the second p/f request including a second group and a second relationship, the second group comprising at least a third p/f group element and a fourth p/f group element, the second relationship defining a desired behavior of the third and fourth p/f group elements with respect to each other during performance of the second p/f request.

In some embodiments, the third group element is the first group. In some embodiments, the first relationship relates to an expected performance of the first group and the second relationship relates to an expected availability of the second group.

In some embodiments, the measurement is a measure of performance between group elements. In some embodiments, the measurement is a measure of availability of the group elements.

In some embodiments, the third p/f group element is the same as the first p/f group element and the fourth p/f group element is the same as the second p/f group element. In some embodiments, the first relationship relates to an expected performance of the first group and the second relationship relates to an expected availability of the second group.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

FIG. 1 shows a block diagram of an embodiment of a job with task groups;

FIG. 2 shows a block diagram of an embodiment of a cell of computing resources;

FIG. 3a shows a block diagram of an embodiment of a p/f group as described herein;

FIG. 3b shows a block diagram of an embodiment of a relationship as described herein;

FIG. 3c shows a block diagram of an embodiment of a target value as described herein;

FIG. 3d shows a block diagram of an embodiment of a p/f request as described herein;

Figure 4:
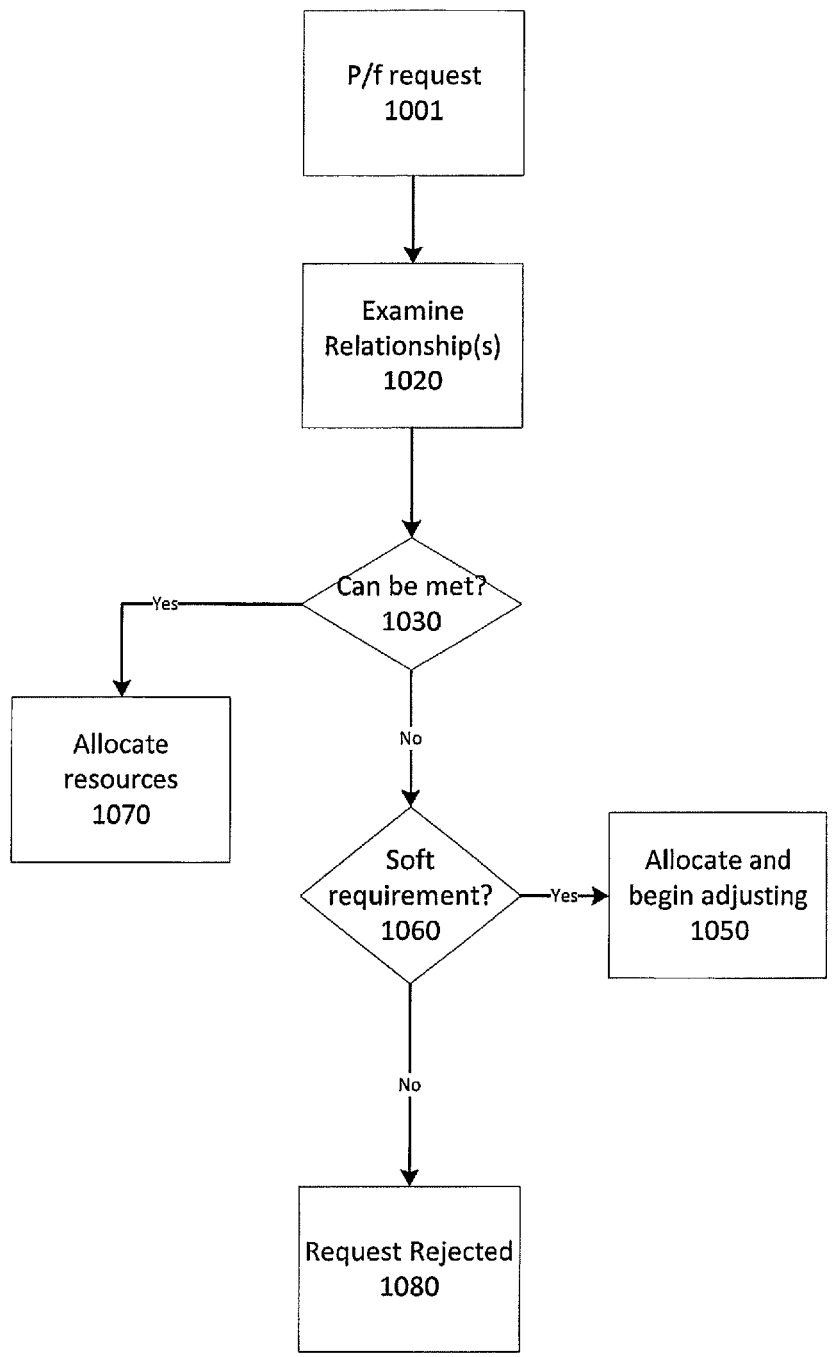
FIG. 4 shows a block diagram of an embodiment of p/f request processing as described herein.
Figure 5:
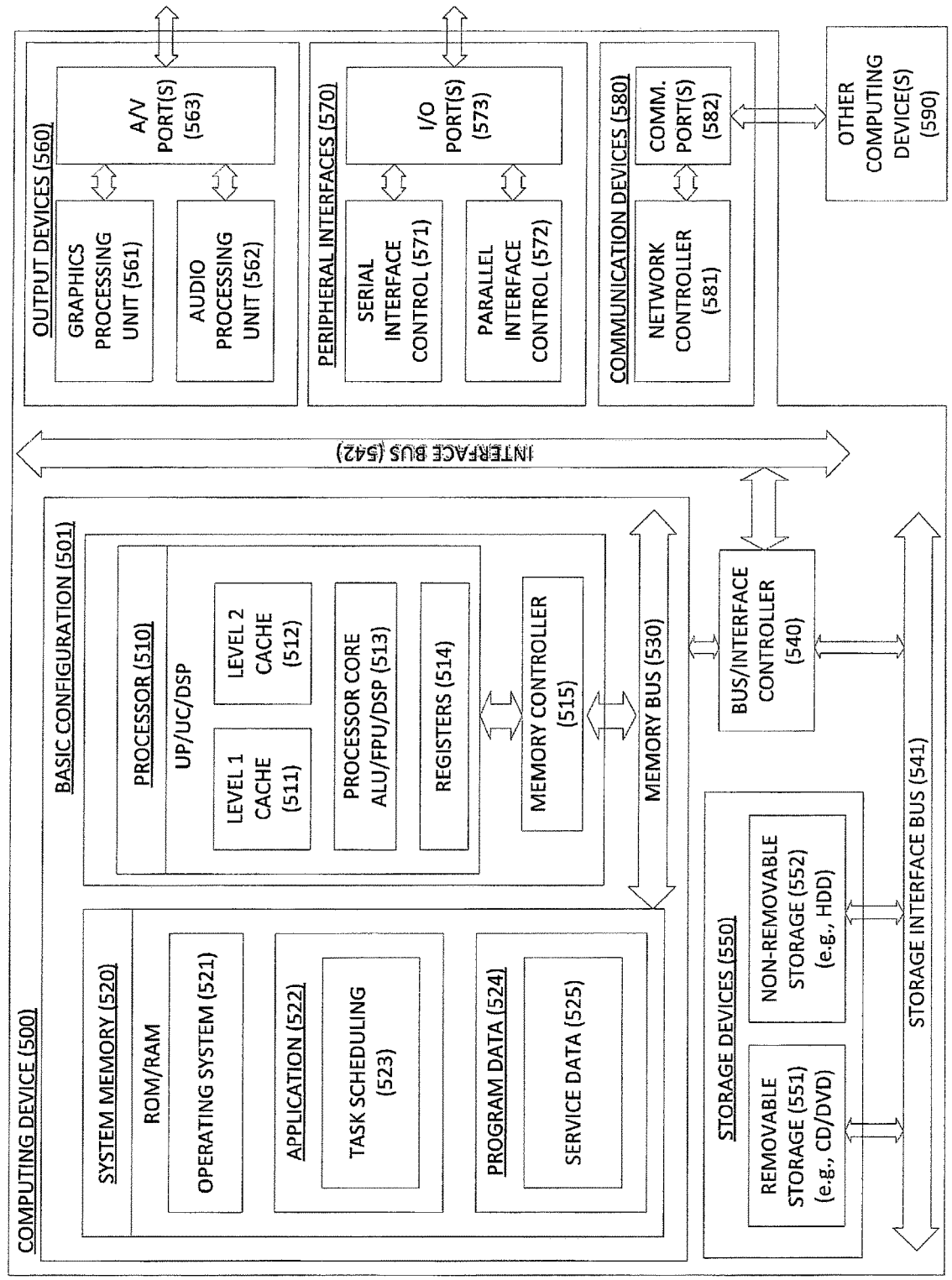
FIG. 5 shows an embodiment of a computing system configured to operate part or all of an embodiment of a computing resource environment as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

Definitions within the context of this document, the following terms will have meanings consistent with the definitions set forth below

[a] Resource: a physical or logical component of a computing system or computing environment or a data item or data collection stored in or accessed by a computing system or computing environment. A "resource" can be specifically identified for purposes of access, processing, tracking, control, or other uses within a system by means of a data structure, logical object, or other structured information representing the resource and/or its inherent or associated properties. Examples of resources include: running processes, applications, physical storage locations, physical machines, virtual machines, processors, process threads, processor time, storage devices, disk drives, interface cards, machines, power, power supply components, network devices, memory, storage space, network bandwidth, storage access time, databases, database entries, and other system objects and/or components.

[b] Task: A task may refer to any entity that a scheduler may place in the context of a computing resource environment. A task may represent a portion of computing work, such as information processing, data access, data storage, data transmission, and/or data reception, to be performed by one or more resources. A task may be scheduled or otherwise allocated or matched to one or more resources through a request. The request may include information about one or more tasks and also information about one or more performance and/or reliability parameters associated with the one or more tasks.

[c] Time-Spec: a time-spec may define one or more time-periods. Such definition may be realized by combinations, groupings, or pairings of time-related values. Embodiments may include a combination of a start time and duration value pair, a start time and an end time value pair, a duration and end time value pair. In some embodiments, the start time of a time-spec may be implied by the time at which a request is created. In some such embodiments, the time-spec may only include an end time or a duration. In some embodiments, a time-spec may include periodicity or recurrence information.

[d] Scheduler: a system, hardware, software, application, or combination thereof that allocates resources to tasks and jobs that request or require those resources in order to be executed or completed or otherwise performed.

In some embodiments, when scheduling a set of cooperating processes (tasks) onto machines in one or more clusters, there are generally many choices for task placement. Typically, the primary role of a scheduling system for such an environment is to find a set of machines with adequate free resources to host the tasks. There may be many combinations of such suitable machines. Different combinations may yield different levels of performance and availability for the distributed application. For example, if the tasks communicate frequently, then placing them close together in terms of network latency and/or bandwidth may improve the application's performance, and vice-versa. If machines have non-identical availabilities (e.g. different MTTR [mean-time-to-recovery] and MTTF [mean-time-to-failure] from one another) and/or failures of sets of machines are correlated (for example because multiple machines share the same power supply or external network link, or are physically proximate), then placing tasks on different combinations of machines can yield different levels of overall application availability.

Just as the tasks of a distributed application have requirements for the amounts of per-machine resources they need, they may also have requirements for performance and availability. In some embodiments, it is preferable if a user or entity deploying an application can avoid having to reason about the amount of free resources on each machine and select machines by hand that meet the resource requirements. In some embodiments, it is preferable to abstract away the various factors that affect performance and availability (e.g., network topology/latency/bandwidth, power network topology, individual machines' availability, machine placement, etc.) and the related complex calculations sometimes needed to find a set of machines that achieve the desired performance and availability.

In some embodiments, such abstraction may be realized using performance/failure requests (p/f requests). A p/f request is request for one or more tasks that can specify or otherwise indicate, at a high-level, a desired performance and failure behavior of a task, set of tasks, or distributed application. A p/f request, operating in conjunction with a scheduler that turns the request into a specific placement of tasks to machines, may automate or facilitate the automated handling and evaluation of the various factors that affect performance and availability (e.g. network topology/latency/bandwidth, power network topology, individual machines' availability, machine placement, etc.) and perform the complex calculations and exploration needed to find an assignment of tasks to machines that achieves the desired performance and availability.

In some embodiments, such automation and abstraction may enable the establishment of seemingly conflicting or difficult-to-accomplish requirements such as high performance coupled with high availability. If task placement or resource allocation is performed chiefly on the basis of availability, tasks may be spread out more than desirable, causing an increase in latency or a reduction in available bandwidth. Similarly, if task placement or resource allocation is performed chiefly on the basis of performance, poor availability may result by allocating too many tasks to a single node or machine.

A p/f request is a request that can specify performance needs and failure limits across a set of tasks and/or across a set of resources. The p/f request specifies a desired correlated behavior for a computing system or group of systems in the execution of one or more tasks, task groups, or applications. In some embodiments, a p/f request may specify a set of tasks and a desired correlated behavior between them. A particular job or application may include an arbitrary number of p/f requests and the set(s) of tasks to which the p/f requests refer may overlap.

A p/f request may specify performance relationships across a group of tasks without specifying how that performance relationship is to be accomplished. In some embodiments, this may be referred to as a p-request.

A p-request may specify factors such as a desired or maximum round-trip latency between any two tasks in a group. For example, a latency of less than or equal to 20 ms may be specified between tasks in a distributed application. The tasks, in some embodiments, may be running on different machines or on the same machine, however the p-request is indifferent, specifying only the latency without further defining whether it is a network latency, inter-processor communication latency, memory-access latency, or other type.

Bandwidth may also be specified by a p-request. Bandwidth may be specified as, for example, either a desired data-transfer rate achievable between any two individual tasks or as a desired data-transfer rate achievable between any two equal-sized subsets of the tasks in a group. The latter may be referred to as bisection bandwidth.

A p/f request may also specify the desired bounds on correlated failures experienced by a group of tasks without specifying how those desired bounds are to be met. In some embodiments, this may be referred to as an f-request.

An f-request may specify factors such as a maximum number of task failures that may occur at any one time. For example, no more than two of any 100 replicas may be permitted to fail at any time. An f-request may also specify overall availability, which may be defined as the fraction of time that some threshold or minimum number of tasks are up or available.

Although f-requests describe how many failures may be tolerated, they do not describe the failure causes. There is no need, in an f-request, to enumerate all the possible causes of faults that might occur. It is sufficient to specify the desired or maximum tolerated effects of faults (e.g. failed tasks).

Embodiments of schedulers capable of or configured to meet p/f requests may be realized by mechanisms such as constraint-based programming, scoring a desirability of a number of different placements against how well the p/f request is satisfied, packing tasks to meet p-requests and then spreading them to fulfill the f-request, maximally-spreading tasks to meet f-requests and then selectively clumping them to meet p-requests, and/or adding/removing hot spare tasks to manage a probability that a job loses more tasks than the failures it can tolerate.

In some embodiments, a p/f request may function like a guarantee. The p-request portion may specify a minimum guaranteed or required performance and the f-request portion may specify a minimum guaranteed or required availability. Such an embodiment treats a p/f request like a hard constraint. In other embodiments, a p/f request may be a soft constraint that the scheduler works to fulfill but is not required to. In some embodiments, a p/f request may be treated as a hard constraint at the initial job submission and as a soft constraint for ongoing performance/failure management.

A p/f request, which is specified by providing a set of tasks and the correlated behaviors desired for them, can be represented by one or more groups, each group describing a set of targets with a desired behavior.

An embodiment of a job comprising multiple tasks is depicted in FIG. 1. In the embodiment shown, a job 4100 may include one or more groups 4120 4140 of tasks. A particular task group 4120 may include a single task 4130 or a particular task group 4140 may include multiple tasks 4150 4160 4170. In some embodiments, a job 4100 may include only a single group 4140 that includes one or more tasks 4150 4160 4170. In some embodiments, a job may include multiple groups 4120 4140 with each group having one or more tasks. In some embodiments, one group 4120 may include a master task 4130 whereas another group 4140 may include worker tasks 4150 4160 4170. In other embodiments, each group 4120 4140 may include the same number of tasks (not shown). In yet other embodiments, each group 4120 4140 may include an arbitrary and/or different number of tasks 4130 4150 4160 4170.

In the embodiment shown, a job 4100 may be regarded as a p/f request with each task group within the job 4120 4140 being regarded as a group included in the request. In some embodiments, an entire job 4100 may be regarded as a group or may only include a single task group (not shown), causing the job 4100 to include or correspond to a single group within a p/f request.

In some embodiments, p/f requests may be met by placing tasks into p/f domains. A p/f domain may describe a set of resources with common properties, such as a common failure set, access latency, or bisection bandwidth. Such p/f domains may provide such p/f information to schedulers for the handling, management, and/or facilitation of p/f requests.

In some embodiments, all the machines that rely on a single PDU (power distribution unit) may be collected into a single f-domain representing the common-mode failures caused by PDU failure. Similarly, in some embodiments, all the machines that use a single rack switch may be grouped into a p-domain to describe their bandwidth and latency properties. In some embodiments, a p/f domain may be represented by one or more groups, each group identifying a set of resources with similar behaviors such as inter-resource performance or correlated failure.

An embodiment of a computing resource domain, such as a cell, including multiple computing resources is depicted in FIG. 2. In the embodiment shown, a cell 5100 may include one or more top-level resource groups, such as racks 5120 5160 or clusters (not shown) or storage or processor arrays (not shown). In some embodiments, a cell 5100 may be replaced with a cluster (not shown), a group of cells (not shown), or other physical or logical grouping of computing resources.

In the embodiment shown, the cell 5100 includes multiple racks 5120 5160, with a rack 5120 including multiple machines 5130 5140 5150. In the embodiment shown, the cell 5100 includes two racks 5120 5160 and each rack includes three machines. However, other embodiments may include arbitrary numbers of racks with each rack including an arbitrary number of machines. Although the embodiment shown refers to racks and physical computing machines, other embodiments may relate to groups of virtual machines or to one or more individual machine components.

In some embodiments, a rack 5160 may include one PDU (not shown) that all the machines 5170 5180 5190 rely on. In other embodiments, a rack may rely on multiple PDUs (not shown), with different machines in the rack relying on different PDUs. In some embodiments, a rack 5120 may include a common network switch (not shown) that all the machines 5130 5140 5150 rely on. In some embodiments, multiple racks 5120 5160 may share a common network switch (not shown) among all the machines in those racks.

In the embodiment shown, a cell 5100 may be regarded as a p/f domain and each rack 5120 5160 regarded as a group. In some embodiments, a cell 5100 or cluster or rack may be regarded as a group or may only include a single resource group (not shown), causing the cell 5100 to include or correspond to a single group.

As noted above, both p/f domains and p/f requests may be specified in terms of groups. Such groups may be referred to as p/f groups. An example of a p/f request is shown in FIG. 3d. In the example shown, a p/f request 3400 may include one or more relationships 3410 3430 and a p/f group 3420. In some embodiments, a p/f request may include only a single relationship 3410 and a p/f group 3410. In some embodiments, a p/f request may include an arbitrary number of relationships. As will be discussed further below, a p/f group 3420 is a collection of group elements or targets whose behavior with respect to each-other is governed by the relationship(s) 3410 3430 included in the p/f request 3400.

A p/f domain and a p/f request are therefore both specified in terms of targets (which may be tasks or resources or pther p/f groups) and the relationships between the targets. The p/f domain information may be used by a scheduler to make placement decisions to achieve the goals defined in a p/f request. However, p/f request and p/f domain information may be logically independent of each-other. P/f domains provide information about resources to schedulers, and p/f requests are specified independent of the p/f domains.

An embodiment of a representation of a p/f group is shown in FIG. 3a. In the embodiment shown, a p/f group 3100 may be part of a p/f request (not shown) or a p/f domain (not shown). In either case, the p/f group includes information about the targets 3170 3180 3190 that comprise the p/f group 3100. In some embodiments, such targets may be referred to as p/f group elements. In some embodiments, one or more targets in a p/f group may refer to one or more other p/f groups, thereby allowing multi-group and cross-group application of a relationship 3410 specified in a p/f request. In some embodiments, the targets 3170 3190 3180 of a p/f group may be tasks or resources included in that p/f group 3100.

The relationship 3410 specified in a p/f request 3400 may indicate a desired performance and/or failure characteristic. For example, for a p/f group 3100 of tasks, the relationship 3410 may specify an inter-task network latency of less than 50 ms. Such a relationship may, in some embodiments, be regarded as defining a p-group as part of or pertaining to a p-request since it relates to required or desired inter-task performance. In another example, for a p/f group 3100 of tasks, the relationship 3410 may specify that at most 2 of any 100 task instances or shards may fail. Such a relationship may, in some embodiments, be regarded as defining an f-group as part of or pertaining to an f-request since it relates to required or desired inter-task reliability and/or failure rates.

Embodiments of relationships may be structured as a tuple that includes a measurement, a comparison, and a target value. An embodiment of a relationship expressed as a tuple is shown in FIG. 3b.

In the embodiment shown, a relationship 3200 includes a measurement 3210. Such a measurement may be the performance or failure metric being specified. Examples of measurements include latency, availability, bandwidth, uptime, and others. In some embodiments, a measurement may be a function of another measurement, such as average (e.g., a mean or a median), a smoothed value, or a percentage.

In the embodiment shown, a relationship 3200 also includes a comparison 3220 and a target value 3230. A comparison 3220 may represent or indicate an operator such as "<" (less than), "<=" (less than or equal), "=" (equal), ">" (greater than), ">=" (greater than or equal), "~" (regular expression matching/evaluation), "!" (not), matching of alphanumeric strings or wildcards, or combination thereof. A target value 3230 may represent or indicate a comparison target for the measurement 3210. For example, for a measurement of "round-trip latency," a comparison of "<" or "<=" may be applied to a target value of, for example, 30 ms. In the example using a "<=" operator, the relationship states that 30 ms is the maximum amount of time permitted for information exchange between tasks.

Embodiments of relationships expressed in an embodiment of a p-request may include different forms of latency, such as a bound on the expected round-trip access latency across any intervening communication path between any two group elements. In embodiments where a group element is itself a group or is used to refer to a group, the latency relationship may apply between any member of that group (recursively) and the rest of the targets. In some embodiments, such a latency relationship may not apply inside the group referred to or specified by the target. Other relationships expressed in an embodiment of a p-request may include bandwidth specifications defining a minimum or desired data transfer rate between any two members of group specified in the request. Other relationships expressed in an embodiment of a p-request may include a specification of bisection bandwidth, aggregate bandwidth and/or measures of bandwidth between any sub-groups or aggregates within the p/f request. In some embodiments where two or more of the targets in a given group are themselves a group (or refer to a group), a bisection or aggregate bandwidth may be specified between such two or more groups.

Also in the embodiment shown, a relationship 3200 may include or be associated with a time spec 3240 that defines a duration of the relationship. In some embodiments, such a time-spec may be omitted. In some embodiments, a time-spec associated with a p/f request may be inferred from a submission or desired completion time associated with the p/f request.

In some embodiments, the target value may be used to specify a value range instead of a specific target value. In one embodiment, such a value range may be specified in terms of a variance relationship. An embodiment of a variance relationship may be one where the target value includes a mean or median or other center value and a percentage or degree of permitted or acceptable variation from that value. For example, instead of simply specifying a bandwidth of at least 0.1 Gb/sec, a target value may specify a value of 0.1 Gb/s with an acceptable range of ±10% or, in some embodiments a specified range of variation such as ±0.3 Gb/s or (−0.1, +0.5) Gb/s.

In some embodiments, a value range specification may allow for some fraction of measurements to deviate from the target value or value range. For example, instead of simply specifying that a bandwidth for data transfer between tasks must be at least 0.1 Gb/sec, the target value may also specify that, for instance, at least 95% of bandwidth measurements for the p/f group should meet or satisfy the target value. In some embodiments, the target value may be represented by one or more tuples of a value and a percentage. An embodiment of a target value expressed as one or more tuples is shown in FIG. 3c.

In the embodiment shown, an embodiment of a variance relationship may be realized by representing the target value 3300 as one or more tuples of a value 3310 and a percentage 3320. The value 3310 may represent a numerical value such as a scalar value, a rate over time, or a measure of time. The percentage 3320 may represent a permitted relative amount of variance from the specified value 3310, such as, for example, 10% or 15%. In some embodiments, a different or additional percentage value 3330 may specify a degree of expected compliance with the relationship. For example, a target value 3300 for round-trip latency of 10 ms may specify a mean value 3310 of 10 ms and a variance percentage 3320 of 10%. Such a target value 3300 may also specify a compliance percentage 3330 of 95%. In an example using a comparison 3320 of "=" the relationship is now defined as: 95% of inter-task latency should be within 10% of 10 ms. Different embodiments of target values may specify some or all of such values or percentages.

Embodiments of variance relationships expressed in an embodiment of a p-request may specify things such as mean CPU-speed and/or CPU-speed variance. A mean CPU speed may specify an average CPU speed for the p-group. An embodiment of a CPU-speed variance specification may specify that, for example, 95% of the targets in the p-group should have and average CPU speed, for example, within 10% of the specified mean.

Other embodiments of relationships expressed in an embodiment of a p-request may specify things such as access-latency variance. For instance, for a specified mean or average latency, an embodiment of an access-latency variance specification may specify that, for example, 95% of the targets in the p-group should be, for example, within 10 ms of that specified mean or average.

Embodiments of relationships expressed in an embodiment of an f-request may be defined in terms of an expected rate of failures (outages), an expected rate of failures (outages) of a given duration, the overall fractional availability (uptime), or reliability. Failure specifications may address failures of parts of the group targets as well as complete group or domain outages. Availability may be generalized to include either or both of frequency and duration of outages. Reliability may be utilized to allow for the possibility of the failure specification not being met. In some embodiments, only one failure relationship can be included in an f-request. In some embodiments, multiple f-requests may apply or refer to the same f-group or set of targets.

In some embodiments, failure relationships may include a specification that indicates an expected fraction of the targets in the f-group that may be affected by an outage. In some embodiments, an exact fraction may be specified. In some embodiments, a maximum permitted fraction may be specified.

In some embodiments, a failure relationship may specify a desired reliability. Such a reliability specification may indicate a probability that the failure relationship will hold good for the duration of its associated f-request. Embodiments of such desired reliability may be specified in absolute or rate-based terms.

Other embodiments of a relationship expressed in an f-request may specify variance relationships such as mean outage frequency or mean failure rate coupled with a fraction or number of the f-group elements or targets that may be affected. Some embodiments may specify mean outage duration(s) or mean availability or uptime with similar fraction or number affected parameters.

An embodiment of p/f request handling is depicted in FIG. 4. In the embodiment shown, a p/f request 1001 may have its associated relationship(s) 1020 examined or evaluated by a scheduler to determine whether the relationship(s) 1020 specified in the request 1001 can be met 1030 with currently available resources in a p/f domain. If the relationship(s) can be met 1030, the scheduler allocates the appropriate resource 1070. If the relationship(s) cannot be met 1030, a further evaluation may be performed to determine whether the requirement(s) specified in the relationship(s) are "soft," meaning that they express preferences rather than hard constraints. In embodiments where the specified relationship(s) of a p/f request 1001 express preferences rather than constraints 1060, the scheduler may prefer to allocate resources from a p/f domain 1050 including resources that come within a certain threshold measure or level of satisfying the preferences. In some embodiments, such allocations 1050 may be adjusted on an ongoing basis due to resource competition and attempts to fully meet the preferences. Otherwise, if the relationship(s) in the p/f request 1001 cannot be met 1030, the request may be rejected 1080 or suspended until such time as there are resources available to meet the preferences (not shown).

As noted above, in some embodiments, a p/f request may be utilized to express a preference instead of a constraint. In some embodiments, a p/f request may include both preferences and constraints. In some such embodiments, a constraint relationship may set limits on performance or failure behavior and a preference relationship may guide evaluation and selection of suitable resources in a p/f domain.

FIG. 6 is a block diagram illustrating an example computing device 500 that is arranged to perform p/f request, domain, and group management techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a resource, task, request, domain, group, and/or relationship management or scheduling feature 523 as discussed herein. Program Data 524 includes location data such as one or more name schemas or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. A method of allocating a set of computing tasks to be performed in a domain of computing resources, the method comprising:
receiving, by a scheduling system having one or more processors, a request to allocate a set of tasks;
identifying a first performance requirement for the set of tasks;
identifying a failure requirement including a failure limit value for the set of tasks, wherein the failure limit value corresponds to a maximum number of task failures;
determining, by the scheduling system, whether the domain includes available computing resources capable of running the set of tasks and satisfying the first performance requirement and the failure requirement for the set of tasks the determining comprising at least one of adding or removing hot spare tasks to manage a probability of meeting the failure limit; and
in response to the determination that the domain includes the available computing resources, allocating, by the scheduling system, at least one available computing resource to fulfill the request.

2. The method of claim 1, wherein the request does not specify how to meet the first performance requirement.

3. The method of claim 1, wherein the first performance requirement includes a latency value, wherein the latency value corresponds to a maximum round-trip latency value for any two tasks of the set of tasks.

4. The method of claim 3, wherein the request is configured such that any two tasks of the set of tasks will be run on different processing machines.

5. The method of claim 1, wherein the request does not specify failure causes.

6. The method of claim 1, wherein determining that the domain includes the available computing resources includes packing tasks of the set of tasks to meet the first performance requirement and then spreading the packed tasks to fulfill the failure requirement to one or more selected computing resources.

7. The method of claim 1, wherein determining that the domain includes the available computing resources includes maximally-spreading tasks of the set of tasks to meet the failure requirements and then selectively clumping the maximally-spread tasks to meet the first performance requirement to one or more selected computing resources.

8. The method of claim 1, wherein the first performance requirement is a hard constraint and the failure requirement is a soft constraint which the scheduling system attempts to fulfill when determining that the domain includes the available computing resources but is not required to fulfill.

9. The method of claim 1, further comprising:
in response to the determination that the domain does not include the available computing resources, determining that the first performance requirement is a soft constraint; and
allocating, by the scheduling system, the at least one available computing resource to fulfill the request based on the determination that the first performance requirement is a soft constraint.

10. A system for allocating a set of computing tasks to be performed in a domain of computing resources, the system comprising one or more processors configured to:
receive a request to allocate a set of tasks;
identify a first performance requirement for the set of tasks;
identify a failure requirement including a failure limit value for the set of tasks, wherein the failure limit value corresponds to a maximum number of task failures;
determine whether the domain includes available computing resources capable of running the set of tasks and satisfying the first performance requirement and the failure requirement for the set of tasks, the determining comprising at least one of adding or removing hot spare tasks to manage a probability of meeting the failure limit; and
in response to the determination that the domain includes the available computing resources, allocate at least one available computing resource to fulfill the request.

11. The system of claim 10, wherein the request does not specify how to meet the first performance requirement.

12. The system of claim 10, wherein the first performance requirement includes a latency value, wherein the latency value corresponds to a maximum round-trip latency value for any two tasks of the set of tasks.

13. A non-transitory computer-readable medium having embodied thereon instructions which, when executed by one or more processors, cause the one or more processors to perform a method of allocating a set of computing tasks to be performed in a domain of computing resources, the method comprising:
receiving a request to allocate a set of tasks; identifying a first performance requirement for the set of tasks;
identifying a failure requirement including a failure limit value for the set of tasks, wherein the failure limit value corresponds to a maximum number of task failures;
determining whether the domain includes available computing resources capable of running the set of tasks and satisfying the first performance requirement and the failure requirement for the set of tasks, the determining comprising at least one of adding or removing hot spare tasks to manage a probability of meeting the failure limit; and
in response to the determination that the domain includes the available computing resources at least one available computing resource to fulfill the request.

14. The non-transitory computer-readable medium of claim 13, wherein the request does not specify how to meet the first performance requirement.

* * * * *